Dec. 14, 1937. H. A. S. HOWARTH 2,102,534
THRUST BEARING
Filed Jan. 13, 1936 2 Sheets-Sheet 1
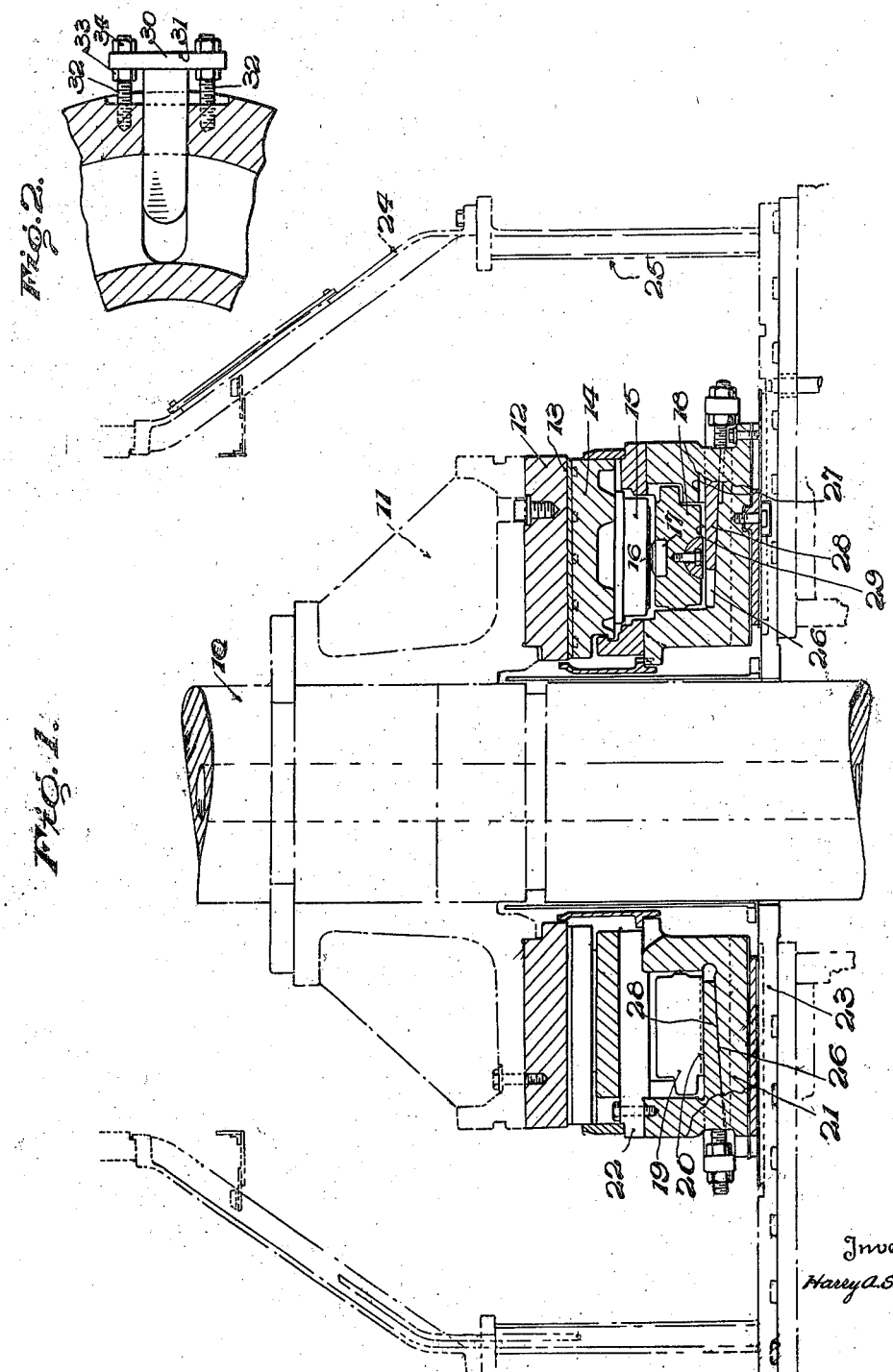
Inventor
Harry A. S. Howarth
By Cameron, Kerkam & Sutton
Attorneys Dec. 14, 1937.  H. A. S. HOWARTH  2,102,534
THRUST BEARING
Filed Jan. 13, 1936  2 Sheets-Sheet 2
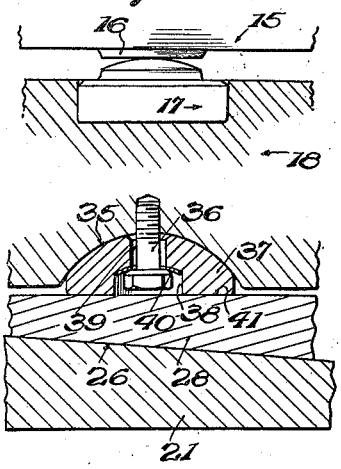
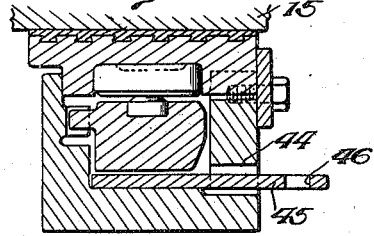
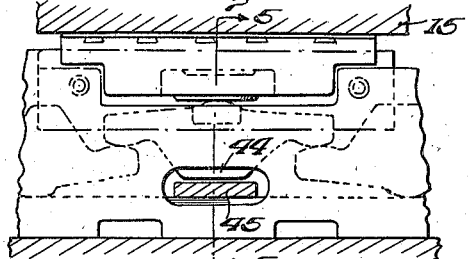
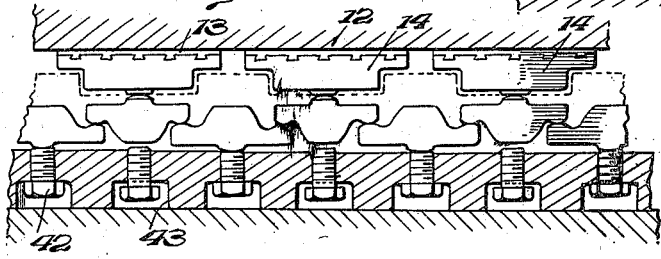
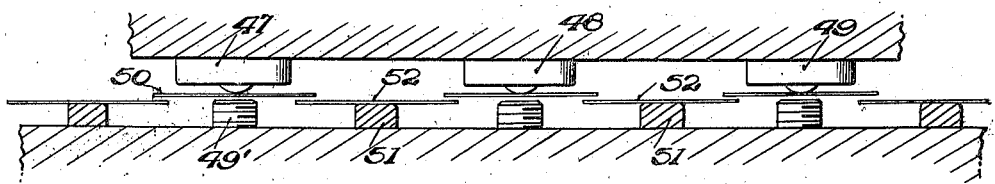
Inventor
Harry A. S. Howarth
By Cameron, Kerkam + Sutton
Attorneys Patented Dec. 14, 1937

2,102,534

UNITED STATES PATENT OFFICE 2,102,534

THRUST BEARING

Harry A. S. Howarth, Philadelphia, Pa., assignor to Kingsbury Machine Works, Inc., Philadelphia, Pa., a corporation of Delaware Application January 13, 1936, Serial No. 58,941

14 Claims. (Cl. 308—160)

This invention relates to Kingsbury thrust bearings, and more particularly to thrust bearings of this type which employ a series of bridged or overlapping tiltable equalizing blocks or plates for automatically distributing the pressure between the shoes or bearing segments of the thrust bearing.

Equalizing means of the type referred to are possessed of distinct and important advantages in their provision for the automatic distribution of pressure between the shoes or bearing segments, thereby avoiding the laborious and time-consuming adjustments necessitated for an equal distribution of pressure among the several bearing shoes when the latter are individually supported on adjustable rigid supporting means. Such equalizing means also have the advantage of compactness, whereby the axial length of the bearing structure may be kept at a minimum. They have the further advantage of satisfactory operation even though by settling of the foundation or other cause the alignment of the thrust bearing is no longer perfect. These and other advantages thereof are well recognized.

On the other hand, the use of such equalizing plates renders difficult the radial removal of individual shoes for inspection, scraping, etc., because the redistribution of the pressure on the series of plates, when a shoe is withdrawn, tends to move the equalizing plate on which said shoe was supported, and the plates on either side of the position of the removed shoe, into the space formerly occupied thereby so that the reinsertion of said shoe into said space is seriously interferred with. Also such equalizing means have no self-contained provision whereby the plane of coaction between the thrust collar and the bearing shoes may be adjusted, and unless shims are used no provision exists in such construction to compensate for slight inaccuracies in the relative axial location of the machine with which the thrust bearing is associated. Furthermore, the structure as a whole lacks that rigidity from the thrust deck through the thrust bearing to the thrust block, and thence to the shaft, that is sometimes considered desirable and which is characteristic of the use of individual rigid supports for the shoes, and apprehension is sometimes expressed as to the danger of undue stress being imposed on a relatively slender thrust shaft if through settling of the foundation or other cause lack of perfect alignment arises, or that injury may arise from improper displacement of the plane of bearing engagement or improper concentration of bearing pressures in the event that for any cause one of the equalizing plates should fail while in service.

It is an object of this invention to provide a thrust bearing of the type employing a series of bridged or overlapping tiltable equalizing blocks or plates, and which will hereinafter be referred to by their more common name of "leveling plates", with means whereby the advantages of this type of equalizing means may be retained to the extent desired and at the same time some if not all of the advantages heretofore obtained by the use of adjustable rigid supports for the individual bearing shoes may be secured.

Another object of this invention is to provide a thrust bearing employing equalizing means of the type characterized which facilitates the radial removal of individual bearing shoes.

Another object of this invention is to provide a thrust bearing employing equalizing means of the type characterized which includes self-contained means for adjusting the plane of bearing contact between the thrust collar and the bearing shoes and therefore for example making allowance for slight errors in the axial location of the machine associated with the thrust bearing.

Another object of this invention is to provide a thrust bearing employing equalizing means of the type characterized which if desired may be made as rigid as bearings employing rigid individual supports for the bearing shoes, and which at the same time retains the advantage of an automatic distribution of the bearing pressure between the several bearing shoes in the preliminary setting of the bearing.

Another object of this invention is to provide a thrust bearing employing equalizing means of the type characterized which if desired may be so adjusted that failure of a leveling plate will not impose an undue concentration of pressures on the bearing shoes or cause an undue displacement of the plane of bearing engagement between the shoes and thrust collar.

Another object of this invention is to provide a thrust bearing employing equalizing means of the type characterized which if desired may be so adjusted as to prevent any substantial displacement of the plane of bearing engagement between the thrust collar and the bearing shoes in the event that an equalizing block should fail, and which at the same time preserves the automatic equalization of pressure between the respective bearing shoes.

Another object of this invention is to provide a thrust bearing employing equalizing means of the type characterized which provides for the removal of bearing shoes radially without removing the thrust load from the bearing, so that in the absence of a crane or hydraulic lift individual shoes may be removed from the bearing for inspection, scraping, etc.

Another object of this invention is to provide a thrust bearing employing equalizing means of the type characterized which provides relatively hard surfaces of support for the tiltable leveling plates in contact with the base ring to enable the base ring to be made of softer metal than might otherwise be required.

Another object of this invention is to provide a thrust bearing employing equalizing means of the type characterized which contains provision for preventing unduly concentrated pressures when an individual shoe is sustained by its associated leveling plate rigidly from the base ring.

Another object of this invention is to provide a thrust bearing employing equalizing means of the type characterized which includes means for individually and preferably adjustably supporting those leveling plates which support the bearing shoes, or for individually and preferably adjustably supporting the leveling plates which are intermediate the shoe-supporting plates, or for individually and preferably adjustably supporting all of the leveling plates of the series.

Another object of this invention is to provide a thrust bearing employing equalizing means of the type characterized wherein the advantages heretofore set out may be secured without substantially increasing the axial length of the thrust bearing structure.

Other objects of the invention will appear as the description proceeds.

The invention is capable of receiving a variety of mechanical expressions, some of which are illustrated on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures, Fig. 1 is an axial section through a thrust bearing embodying the present invention, with certain parts omitted for clearness of illustration;

Fig. 2 is a fragmentary detail in plan on an enlarged scale of one of the adjustable wedges;

Fig. 3 is a fragmentary detail on an enlarged scale of the preferred construction of those leveling plates which support the bearing shoes;

Fig. 4 is a fragmentary elevation, developed into a single plane, of an embodiment of the present invention using jack screws in place of wedges;

Figs. 5 and 6 are fragmentary views, in cross section and front elevation respectively, of a further embodiment of the present invention; and Fig. 7 is a diagrammatic view to facilitate understanding of the sequence of operations in the event that a shoe is to be removed from the bearing without removing the load from the bearing.

Referring to Fig. 1, 10 designates any suitable shaft provided with a thrust block 11 of any suitable construction and mounted thereon in any suitable way. Attached to said thrust block in any suitable manner is the thrust collar 12 having a bearing surface 13 which is in bearing contact with the bearing surfaces of a plurality of bearing shoes or segments 14 of any suitable number, size, construction, material, etc. As shown each of said shoes 14 is mounted on or provided in its rear face with a block 15 having at its own rear face a spherically faced projection 16 adapted to make rocking contact with and tilt universally with respect to a wear-resisting block 17 carried by a leveling plate 18. Leveling plate 18 is one of a series of bridged or overlapping tiltable leveling plates as well understood in the art, alternate leveling plates 19, as shown at the left of Fig. 1, having rearwardly extending rocking supports which here may take the form of radially directed knife edge projections 20 by which they are supported on the base ring 21, while the intermediate leveling plates 18, corresponding in number to the shoes to be supported, are in bridged or overlapping relationship with said plates 19, and individually support the respective shoes, as illustrated more clearly by the diagrammatic developments into a single plane of Figs. 4 and 7. The bridged series of leveling plates 18 and 19 are located within a channel-shaped base ring 21 and retained against displacement therein in any suitable way, said base ring 21 being shown as carrying a shoe cage 22 suitably attached thereto. Said base ring 21 is supported on any suitable base structure or thrust deck 23, with or without provisions for insulation, and as diagrammatically illustrated in Fig. 1 the bearing may be enclosed in a suitable housing 24 which provides an oil well in which the bearing members may run immersed, as well understood in the art. Any suitable means for cooling the oil in the well 25, or circulating the oil to and from the oil well, etc., may be provided, but as such elements form no part of the present invention illustration or description thereof is deemed unnecessary.

In conformity with the present invention adjustable means are provided for permanently or selectively sustaining the load on either or both of the leveling plates 18 and 19. In the form shown in Figs. 1 and 2 adjustable supports are provided for both the plates 18 and 19, but it is to be expressly understood that it is within the contemplation of the present invention to provide adjustable supports for only the plates 18, or for only the plates 19, if it is desired that only certain of the advantages hereinafter discussed are to be obtained. As illustrated in Figs. 1 and 2 the bottom of the channel-shaped base ring 21 is provided with a plurality of radially extending slots 26, corresponding in number to the number of the leveling plates 18 and 19, each of said slots communicating with an aperture 27 extending through the outer wall of the base ring 21. The bottom wall of each of said slots 26 is inclined outwardly, and mounted in each of said slots 26 is a wedge 28 whose taper corresponds with the inclination of the bottom of the slot 27, so that the upper surface 29 of each of said wedges may lie in a plane which is at right angles to the axis of the shaft. The degree of taper provided the wedges may be widely varied depending upon the extent of adjustment desired. Each of said wedges has such a thickness in its axial direction that it may be moved into supporting relationship with the leveling plate beneath which said wedge is disposed so as to perform the functions hereinafter described more in detail.

Each of said wedges is preferably so mounted that it may be driven by a hammer or moved inwardly and outwardly by screw thread action. To this end, as illustrated more in detail in Fig. 2, each of said wedges is provided with a transverse head 30 providing an outer free surface 31 which may be used when it is desired to drive the wedge by a hammer, and each lateral extremity of said head 30 is provided with an aperture to receive a threaded stud 32 suitably mounted in the wall of the base ring 21. Mounted on each stud 32 for contact with the opposed faces of the head 30 are nuts 33 and 34. By backing off the nuts 33 the nuts 34 may be employed for forcing the wedges inwardly, or by backing off the nuts 34 the nuts 33 may be employed for moving the wedges outwardly, after which both sets of nuts may be tightened to lock the wedges in position.

The leveling plates 19 ordinarily have radial knife-edge engagement with their supporting surfaces, and if through lack of alignment or other cause the rotation of the shaft is accompanied by a continuous rocking movement of said leveling plates 19, grooves may eventually be worn in the bottom of the channel in the base ring 21. The wedges 28 which make contact with the leveling plates 19 are therefore preferably formed of hardened material so as to resist this wear. This enables the ring 21 to be made of softer metal without special provision for the hardening of its surface with which the plates 19 would otherwise engage.

The plates 19 when moving upon radial knife-edged surfaces tilt only in a circumferential direction, but the intermediate plates 18, which carry the bearing shoes may tilt radially as well as circumferentially, and therefore if the wedges 28 were moved into contact with the rear faces of said plates 18 undesirable concentrations of pressures might occur in the event that the plates 18 are tilted out of their normal no-load position. To avoid such concentrations of pressures each of the plates 18 is preferably provided in its rear face with a spherically faced recess 35, and mounted in said recess on a bolt 36 is a spherically faced washer 37, recessed at 38 to receive the head of said bolt. The washer 37 is provided with an aperture 39 which has a substantial clearance from said bolt 36, and interposed between the head of said bolt and the bottom of the recess 38 is a spring washer 40 which normally holds the washer 37 in central position, but which may yield so as to permit movement of the washer 37 with respect to the leveling plate to enable the outer face 41 of said washer to make flatwise engagement with the surface of the wedge 28 even though the plate 18 is so tilted that its rear face is angularly disposed with respect to the inner face of the wedge 28.

While wedges are preferred the invention is not restricted to the use of wedges as any other suitable means, such as hydraulic cells, jack screws, etc., may be used in place of wedges for performing the described functions. Thus, as shown in Fig. 4, a jack screw 42 may be disposed under each of the plates 18 or under each of the plates 19 or under both plates 18 and 19 as illustrated, the lower face of the base ring 21 in this instance being preferably provided with recesses 43 into which wrenches may be inserted from the side of the bearing so as to adjust the jack screws 42 in the manner herein described. Suitable means for locking the screws 42 in position may be provided if desired.

If the means for supporting the leveling plates is to cooperate only with those leveling plates which underlie the bearing shoes, some of the advantages of the present invention may be obtained by the simple construction shown in Figs. 5 and 6 wherein the bottom face of the channel in the base ring 21 is not grooved but apertures 44 are provided in its outer wall opposite each of the plates 18. When one or more of said plates 18 are to be supported independently of the series of leveling plates, a filler plate 45 of any suitable size and construction may be inserted through the aperture 44 under a plate 18, said filler plate 45 being shown as provided with an aperture 46 so that a bar may be placed therein to facilitate insertion and removal thereof. Said filler plate may substantially fill the space between the bottom of the channel in the base ring and the rear face of the plate 18, or said filler piece may be supplemented with one or more shims as required.

A bearing constructed in conformity with the present invention enables individual shoes to be removed from the bearing radially thereof without taking the load off of the bearing if such is desirable because of the absence of a hydraulic lift or crane, etc. Referring to the diagrammatic illustration of Fig. 7 showing three shoes 47, 48 and 49, assume that it is desired to remove the shoe 48. First, all of the wedges or other means under the leveling plates 50 which underlie the shoes are moved to take the load in whole or in part off of the shoes, it not being necessary that the entire load be taken off of the shoes. Then one or both of the wedges or other means 51 under the intermediate leveling plates 52 at either side of the shoe 48 are withdrawn sufficiently so that said plates are freed with respect to the leveling plate 50 under the shoe 48—said shoe 48 being still rigidly supported by the wedge or other means thereunder. Then the means under the shoe 48 may be withdrawn to lower said shoe and its plate 50 sufficiently to enable the shoe 48 to be entirely removed through a suitable aperture in the outer face of the channel-shaped base ring 21. The thrust load is now carried by the remaining shoes and the rigidly locked plates thereunder, and if desired a shoe at the diametrically opposite side of the bearing may also be removed at the same time by a like procedure. In fact so long as the load is kept in proper balanced relationship on retained shoes at opposite sides of the bearing a plurality of shoes at opposite sides of the bearing may be withdrawn for inspection, scraping, etc., although in order to avoid undue concentration of loads on the remaining shoes it is ordinarily undesirable to withdraw more than one or two shoes at a time. When a removed shoe is to be reinserted the procedure described for removal is reversed, and thereafter all of the wedges or other means are returned to their original position.

If the load is removed from the bearing before a shoe is withdrawn for inspection, scraping, etc., the wedges or other means under the leveling plates 18 (or 50 in Fig. 7) are adjusted into light contact therewith so as to remove the slack from the series of leveling plates. Preferably, although not necessarily, this should be done before the load is removed from the bearing. Now when a shoe is removed the leveling plate thereunder is not moved into the gap formerly occupied by said shoe by the automatic action of the remaining portion of the equalizing system. Hence the shoe so removed can subsequently be restored to its position without the difficulty heretofore experienced owing to the leveling plate thereunder having been moved into the gap formerly occupied by the shoe. With the embodiment of Figs. 5 and 6, the filler plates 45 may be inserted in position as shown and they will prevent such a transference of load to the plate 18 underlying a shoe to be removed as will raise said plate into the gap formerly occupied by the shoe.

When the wedges or other means as heretofore described are used under the plates 19 the plane of bearing engagement between the rotatable thrust collar and the bearing shoes may be adjusted, as for example, to compensate for slight errors in the axial location of the associated machine, by correspondingly advancing or withdrawing the several wedges thereunder, and thereby the bearing may be suitably adjusted, as when rigid adjustable supports for the individual shoes have heretofore been used, while retaining the automatic adjustment of pressure incident to the use of the series of bridged leveling plates.

When adjustable wedges or other means are employed in conjunction with the leveling plates 18 on which the bearing shoes are mounted, the automatic distribution of pressure may be obtained between the respective shoes, in conformity with the normal operation of a series of bridged leveling plates, and then the bearing may be made as rigid as in the case of bearings employing rigid individual supports for the shoes by advancing the wedges or other means so as to sustain the loads on the respective plates 18. Thereafter the load is transmitted from each bearing shoe directly through its underlying plate 18 to the wedge or other means in contact therewith and the bearing possesses the rigidity heretofore obtained with individual adjustable rigid supports, but the pressure on the shoes may be accurately equalized by the automatic functioning of the tiltable leveling plates in the preliminary setting of the bearing without the laborious operations which have heretofore characterized the use of jack screws, for example, when an accurately predetermined distribution of pressure has been obtained.

Furthermore, with the wedges or other means so sustaining the load on the respective shoes, any danger of undue concentration of pressures upon failure of a leveling plate is eliminated, as each shoe is now individually supported through its individual wedge or other means. In place of advancing the wedges or other means under the plates 18 to a position in which the load is sustained thereby, they may be advanced to a position in which they have only a slight clearance from said plates 18, in which event the leveling plates may still continue to function as an automatic equalizing means, but in the event of failure of any of said plates the bearing shoes will be lowered only to that extent which is necessary to take up the clearance between the plates 18 and the wedges or other means underlying the same, whereupon all of the shoes are individually supported, and any danger of injury to the associated machine due to an undue displacement of the plane of bearing engagement is therefore avoided.

By use of the wedges or other means of the present invention, the advantages of the automatic action of a series of tiltable leveling plates is therefore fully obtained, and at the same time the various advantages heretofore obtained by the use of adjustable rigid supports for individually supporting the several shoes can also be secured. Moreover, the present invention provides for the accomplishment of these combined advantages without increasing the axial length of the bearing structure, as the provision for adjusting the wedges, screws or other means is readily accessible from the side of the bearing and self-contained within the bearing structure. In the case of the adjustable wedges of Figs. 1 and 2, for example, the wedges may be inserted or withdrawn to fulfill one or more of the purposes above discussed and readily restored to their initial position by noting the position of the inner face of the head 31 with respect to the adjacent surface of the base ring, as by a gauge, template or other means, and thereafter restoring the head of the wedge to its original position.

By use of wedges of hardened material, any undue wear on the bottom face of the channel in the base ring is avoided, and by use of the spherically faced washers in the rear of the leveling plates undue concentrations of loads between the equalizing plates and the supporting means may be avoided. While ordinarily such spherical washers need only be used in conjunction with the shoe-supporting plates 18, it is to be understood that if for any reason it is found desirable the present invention contemplates the use of such spherical washers in the intermediate plates 19.

It will therefore be perceived that by the present invention means have been provided whereby the advantages inherent in the use of a series of bridged or overlapping tiltable equalizing plates are retained and at the same time provision is made whereby those advantages heretofore obtained only by the use of adjustable rigid supports for individually supporting the respective shoes may also be secured without the inherent difficulties present in securing an equalized distribution of pressure between the respective shoes by individual manipulation of such separate adjustable supports therefor. It will be noted that in the normal operation of the equalizing means of the present invention when functioning as an automatic equalizer of pressure between the respective bearing shoes it is not essential that the wedges in engagement with the shoes 19 be precisely located so far as their active faces are concerned, because the leveling plates will function as an automatic equalizer although the active faces of the wedges do not lie in the same plane.

While it is preferred to provide the bearing with wedges, jack screws, or other means, for cooperation with both the plates 18 and 19, such is not essential, as the supporting means may be associated only with the shoe-supporting plates 18, the embodiment of Figs. 5 and 6 being a simple embodiment of such construction, or the supporting means may be associated only with the intermediate plates 19, in either of which events some of the advantages of the present invention are obtained, although to secure all of the advantages of the present invention supporting means for cooperation with both plates 18 and 19 are desirable. Other forms of adjustable supporting means than herein described will now suggest themselves to those skilled in the art and it is to be understood that the invention is not necessarily restricted to the particular means disclosed.

While the embodiments of the invention illustrated on the drawings have been described with considerable particularity, it is to be expressly understood that the invention is not to be restricted thereto, as the same is capable of receiving a variety of mechanical expressions, some of which will now readily suggest themselves to those skilled in the art. Other forms, constructions and arrangements of equalizing plates may be employed in the broader aspects of this present invention, the invention may be incorporated in bearings in which the bridged series of leveling plates do not extend completely around the bearing structure, and some of the features of the invention may be used without other features where only some of the advantages arising from the present invention are desired, etc. Changes may also be made in other details of construction and arrangement without departing from the present invention. Reference is therefore to be had to the appended claims for a definition of the limits of the invention.

What is claimed is:

1. In a thrust bearing employing a plurality of tiltable bearing shoes, a support, means for distributing the pressure between said shoes comprising a series of bridged tiltable leveling plates, alternate plates of which series support the respective shoes and intermediate plates of which series are mounted on said support, and adjustable wedges individual to said shoe-supporting plates and mounted in slots in said support, said slots having inclined bottom faces, said wedges having their faces toward said plates in planes substantially at right angles to the axis of said bearing and their opposite faces inclined to conform with the inclination of the bottom of said slots, and said wedges being movable in said slots to support rigidly said shoe-supporting plates.

2. In a thrust bearing employing a plurality of tiltable bearing shoes, a support, means for distributing the pressure between said shoes comprising a series of bridged tiltable leveling plates, alternate plates of which series support the respective shoes and intermediate plates of which series are mounted on said support, and adjustable wedges for supporting each of said intermediate plates individually, and movable to adjust the plane of said bearing shoes, said wedges being mounted in slots in said support and having inclined faces at the opposite sides thereof from said plates, said slots having inclined bottom faces which conform with the inclination of said faces on said wedges, and said wedges having their opposite faces disposed in planes substantially at right angles to the axis of the bearing.

3. In a thrust bearing employing a plurality of tiltable bearing shoes, a support, means for distributing the pressure between said shoes comprising a series of bridged tiltable leveling plates, alternate plates of which series support the respective shoes and intermediate plates of which series are mounted on said support, means associated with each shoe-supporting plate for taking the load on the corresponding shoe, and a spherically mounted washer on each shoe-supporting plate adapted to be engaged by said last named means.

4. In a thrust bearing employing a plurality of tiltable bearing shoes, a support, means for distributing the pressure between said shoes comprising a series of bridged tiltable leveling plates, alternate plates of which series support the respective shoes and intermediate plates of which series are mounted on said support, adjustable means co-operating with individual plates for controlling said plates, and spherically mounted washers at the rear of individual plates for engagement by said adjustable means.

5. In a thrust bearing employing a plurality of tiltable bearing shoes, a support, means for distributing the pressure between said shoes comprising a series of bridged tiltable leveling plates, alternate plates of which series support the respective shoes and intermediate plates of which series are mounted on said support, adjustable means associated with individual leveling plates for selectively controlling the same, and means on individual leveling plates movable with respect thereto for making flatwise engagement with the corresponding adjustable means.

6. In a thrust bearing employing a plurality of tiltable bearing shoes, a support, means for distributing the pressure between said shoes comprising a series of bridged tiltable leveling plates, alternate plates of which series support the respective shoes and intermediate plates of which series are mounted on said support, said support having slots underlying and corresponding in number to the number of said shoe-supporting plates and provided with inclined bottom surfaces, and adjustable wedges associated with each of said shoe-supporting plates and slidable in said slots, said wedges having their outer faces in planes at right angles to the axis of the bearing and adapted to be moved into and out of pressure sustaining relationship with said shoe-supporting plates.

7. In a thrust bearing employing a plurality of tiltable bearing shoes, a support, means for distributing the pressure between said shoes comprising a series of bridged tiltable leveling plates, alternate plates of which series support the respective shoes and intermediate plates of which series are mounted on said support, said support having slots underlying and corresponding in number to the number of said intermediate plates and provided with inclined bottom surfaces, and adjustable wedges associated with each of said intermediate plates and slidable in said slots for adjusting the plane of bearing engagement of said shoes, said wedges having their outer faces in planes at right angles to the axis of the bearing.

8. In a thrust bearing employing a plurality of tiltable bearing shoes, a support, means for distributing the pressure between said shoes comprising a series of bridged tiltable leveling plates, alternate plates of which series support the respective shoes and intermediate plates of which series are mounted on said support, adjustable wedges associated with each of said shoe-supporting plates, and means on each shoe-supporting plate movable with respect thereto for making flatwise engagement with the corresponding wedge.

9. In a thrust bearing employing a plurality of tiltable bearing shoes, a support, means for distributing the pressure between said shoes comprising a series of bridged tiltable leveling plates, alternate plates of which series support the respective shoes and intermediate plates of which series are mounted on said support, said support having slots underlying and corresponding in number to the number of said plates and each of said slots having an inclined bottom surface, and adjustable wedges associated with each of said leveling plates and slidable in said slots, said wedges having outer faces in planes at right angles to the axis of said bearing and being movable into and out of said slots to control the operation of said plates.

10. In a thrust bearing employing a plurality of tiltable bearing shoes, a support, means for distributing the pressure between said shoes comprising a series of bridged tiltable leveling plates, alternate plates of which series support the respective shoes and intermediate plates of which series are mounted on said support, said support having slots provided with inclined bottom surfaces, adjustable wedges associated with individual plates and slidable in said slots, said wedges having outer faces in planes at right angles to the axis of the bearing, and means on said plates movable with respect thereto for making flatwise engagement with the corresponding wedges.

11. In a thrust bearing employing a plurality of tiltable bearing shoes, a support, means for distributing the pressure between said shoes comprising a series of bridged tiltable leveling plates, alternate plates of which series support the respective shoes and intermediate plates of which series are mounted on said support, said support having slots provided with inclined bottom surfaces, and adjustable wedges associated with individual leveling plates and slidable in said slots, said wedges having outer faces in planes at right angles to the axis of the bearing and being provided with threaded means for advancing and withdrawing the same with respect to said leveling plates.

12. In a thrust bearing employing a plurality of tiltable bearing shoes, a support, means for distributing the pressure between said shoes comprising a series of bridged tiltable leveling plates, alternate plates of which series support the respective shoes and intermediate plates of which series are mounted on said support, said support having slots provided with inclined bottom surfaces and adjustable wedges associated with individual plates and slidable in said slots for selectively taking the load on said plates, said wedges having outer faces lying in planes at right angles to the axis of the bearing.

13. In a thrust bearing employing a plurality of tiltable bearing shoes, a support, means for distributing the pressure between said shoes comprising a series of bridged tiltable leveling plates, alternate plates of which series support the respective shoes and intermediate plates of which series are mounted on said support, and filler plates insertable between each of said shoe-supporting plates and said support to prevent displacement thereof.

14. In a thrust bearing employing a plurality of tiltable bearing shoes, a support, means for distributing the pressure between said shoes comprising a series of bridged tiltable leveling plates, alternate plates of which series support the respective shoes and intermediate plates of which series are mounted on said support, and adjustable wedges associated with each of said intermediate plates and with which said intermediate plates have rocking engagement, said wedges having their surfaces in engagement with said plates lying in planes at right angles to the axis of the bearing and being formed of hardened material.

HARRY A. S. HOWARTH.